(12) United States Patent
Ramlall

(10) Patent No.: US 9,369,329 B1
(45) Date of Patent: Jun. 14, 2016

(54) LOW-COMPLEXITY NON-DATA-AIDED ESTIMATION OF SYMBOL TIME OFFSET IN OFDM SYSTEMS

(71) Applicant: The United States of America as represented by the Secretary of the Navy, Washington, DC (US)

(72) Inventor: Rohan Y. Ramlall, Brentwood, CA (US)

(73) Assignee: THE UNITED STATES OF AMERICA AS REPRESENTED BY THE SECRETARY OF THE NAVY, Washington, DC (US)

( * ) Notice: Subject to any disclaimer, the term of this patent is extended or adjusted under 35 U.S.C. 154(b) by 0 days.

(21) Appl. No.: 14/721,313

(22) Filed: May 26, 2015

Related U.S. Application Data

(63) Continuation-in-part of application No. 14/091,048, filed on Nov. 26, 2013, now Pat. No. 9,083,596.

(51) Int. Cl.
*H04L 27/26* (2006.01)
*H04L 25/03* (2006.01)

(52) U.S. Cl.
CPC ...... *H04L 27/2691* (2013.01); *H04L 25/03012* (2013.01); *H04L 27/2659* (2013.01); *H04L 27/2663* (2013.01); *H04L 2025/03414* (2013.01)

(58) Field of Classification Search
USPC .......... 375/348, 262, 260, 347; 370/329, 203, 370/208
See application file for complete search history.

(56) References Cited

U.S. PATENT DOCUMENTS

| | | | |
|---|---|---|---|
| 8,218,665 B2 * | 7/2012 | Chin | H04L 27/2657 375/262 |
| 2006/0239179 A1 * | 10/2006 | Berkeman | H04L 27/2678 370/208 |
| 2009/0028042 A1 * | 1/2009 | Chin | H04L 27/2662 370/203 |
| 2013/0176952 A1 * | 7/2013 | Shin | H04L 5/001 370/329 |
| 2014/0010334 A1 * | 1/2014 | Kotzsch | H04B 1/1081 375/347 |
| 2015/0229507 A1 * | 8/2015 | Kim | H04L 27/2692 375/260 |
| 2015/0256379 A1 * | 9/2015 | Dhayni | H04L 27/2662 375/348 |

OTHER PUBLICATIONS

J.J. Van De Beek, M. Sandell, P.O. Botjesson, "ML estimation of time and frequency offset in OFDM systems," IEEE Trans. Signal Process., vol. 45, No. 7, pp. I800-1805, Jul. 1997.
J.A. Lopez-Salcedo, E. Gutierrez G. Seco-Granados, A.L. Swinehurst, "Unified framework for the synchronization of flexible multicarrier communication signals," IEEE Trans. Signal Process., vol. 61, No. 4, pp. 828-842, Feb. 2013.
K. Ramasubramanian, K. Baum, "An OFDM timing recovery scheme with inherent delay-spread estimation," Proc. 2001 IEEE GLOBECOM, vol. 5, pp. 3111-3115, 2001.

(Continued)

*Primary Examiner* — Eva Puente
(74) *Attorney, Agent, or Firm* — SPAWAR Systems Center Pacific; Kyle Eppele; Ryan J. Friedl

(57) ABSTRACT

A system and method involve receiving a plurality of samples of at least one orthogonal frequency division multiplex (OFDM) signal, the samples containing at least one complete OFDM symbol including data samples and a cyclic prefix comprising inter-symbol interference (ISI) samples and one or more ISI-free samples, and determining a symbol time offset estimate θ that minimizes the squared difference between the ISI-free samples and their corresponding data samples and satisfies a correlation based boundary condition.

18 Claims, 12 Drawing Sheets

(56) References Cited

OTHER PUBLICATIONS

J. Wen; S. Lee; G. Lee; J. Chang, "Timing and delay spread estimation scheme in OFDM systems," IEEE Trans. Consum. Electron., vol. 54, No. 2, pp. 316-320, May 2008.

V. Nir, T. van Waterschoot, J. Duplicy, M. Moonen, "Blind coarse timing offset estimation for CP-OFDM and ZP-OFDM transmission over frequency selective channels," EURASIP J. Wireless Commun. and Networking, article ID 262813, pp. 1-8, 2009.

W.L. Chin, "ML Estimation of Timing and Frequency Offsets Using Distinctive Correlation Characteristics of OFDM Signals Over Dispersive Fading Channels," IEEE Trans. Veh. Technology, vol. 60, No. 2, pp. 444-456, Feb. 2011.

B. Hughes, "Differential space-time modulation," IEEE Trans. Inf. Theory, vol. 46, No. 7, pp. 2567-2578, Nov. 2000.

A. Molisch, "Channel models," in Wireless Communications, 2nd ed. Chichester, England: Wiley, 2011, pp. 125-143.

R. Mo, Y. Chew, T. Tjhung, C. Ko, "A joint blind timing and frequency offset estimator for OFDM systems over frequency selective fading channels," IEEE Trans. Wireless Commun., vol. 5, No. 9, pp. 2594-2604, Sep. 2006.

X. Liu, K. Pan, Y. Zuo, J. Chen, "Blind Symbol Synchronization for OFDM Systems in Multipath Fading Channels," Proc. IEEE WiCOM, Chengdu, China, Sep. 2010, pp. 1-4.

3GPP, "Technical Specification Group Radio Access Network; Deployment aspects," TR 25.943, Sep. 2012, V11.0.0.

\* cited by examiner

LOW-COMPLEXITY NON-DATA-AIDED ESTIMATION OF SYMBOL TIME OFFSET IN OFDM SYSTEMS

CROSS-REFERENCE TO RELATED APPLICATIONS

This application is a continuation-in-part of U.S. Non-Provisional patent application Ser. No. 14/091,048 filed Nov. 26, 2013, entitled "Non-Data-Aided Joint Time and Frequency Offset Estimate Method for OFDM Systems Using Channel Order Based Regression", the content of which is fully incorporated by reference herein.

FEDERALLY-SPONSORED RESEARCH AND DEVELOPMENT

The Low-Complexity Non-Data-Aided Estimation of Symbol Time Offset in OFDM Systems is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-5118; email ssc_pac T2@navy.mil; reference Navy Case Number 103048.

BACKGROUND

Orthogonal frequency division multiplexing (OFDM) is a popular multicarrier modulation method that has been adopted in numerous wireless networking and broadcasting standards such as IEEE 802.11a/g/p, LTE, and DVB-T/T2. Some of the key advantages of OFDM are its high spectral efficiency, robustness to inter-symbol interference (ISI) caused by multipath, and its ability to equalize wideband channels. However, OFDM is sensitive to time and frequency offsets, which need to be estimated in order to correctly demodulate the received data.

Recent work has focused on blindly estimating these offsets. Non-data-aided estimators have the advantage of not requiring any known training data, thus preserving high bandwidth efficiency. A major drawback to many time offset estimators is that they are designed for single path channels and their estimation performance degrades in multipath channels. Even estimators that are designed for multipath channels tend to have high computational complexities.

A need exists for a new joint symbol time offset (STO) and carrier frequency offset (CFO) estimator for OFDM systems when the channel order is less than or equal to the length of the cyclic prefix that is low-complexity and does not suffer performance degradation in multipath channels.

DETAILED DESCRIPTION OF SOME EMBODIMENTS

The subject matter disclosed herein involves a joint STO and CFO estimator for OFDM systems when the channel order is less than or equal to the length of the cyclic prefix. The estimator is low-complexity and does not suffer performance degradation in multipath channels. The estimator disclosed exploits the redundancy of the last sample of the received cyclic prefix, which is not corrupted by inter-symbol interference (ISI), thus helping the estimator correctly estimate the time of arrival in multipath channels.

The estimator discussed herein has been demonstrated to identify the correct STO with a higher probability than other estimators, which is important to OFDM systems so that pilots are not needed to refine the STO estimate in the frequency domain and is critical to OFDM systems using differential modulation since pilots may not be available.

In general, the low-pass frequency-selective channel model is given by $$h(t) = \sum_{l=0}^{L-1} h_l \delta(t - lT_s) \qquad \text{(Eq. 1)}$$

where L is the order of the channel, $h_l$ is the complex amplitude of the l-th multipath arrival, and $T_s$ is the sampling period. The channel is assumed to stay unchanged over the duration of a couple of OFDM symbols. The transmitted OFDM symbol s(n) n=0, . . . ,N+$N_{cp}$−1 is produced by taking the N point inverse fast Fourier transform (IFFT) of the modulated data symbols $\{x_d, d=0, \ldots, N-1\}$ and pre-pending the last $N_{cp}$ samples. It is assumed that the channel order is less than or equal to the length of the cyclic prefix (i.e., L≤$N_{cp}$). Hence, the correlation between the transmitted OFDM symbol's data portion and its cyclic prefix is given by $$E[s(a)s^*(b)] = \begin{cases} \sigma_s^2, & \text{if } a = b & b \in \{0, \ldots, N+N_{cp}-1\} \\ \sigma_s^2, & \text{if } a = b+N & b \in \{0, \ldots, N_{cp}-1\} \\ \sigma_s^2, & \text{if } a = b-N & b \in \{N, \ldots, N+N_{cp}-1\} \\ 0, & \text{otherwise} \end{cases} \qquad \text{(Eq. 2)}$$

where $\sigma_s^2$ is the signal power. After convolution with the channel, the samples of the received OFDM symbol at the receiver are given by $$r(k) = e^{j2\pi\epsilon k/N}\sum_{l=0}^{L-1}h(l)s(k-l)+n(k) \; k=\theta,\ldots,\theta+N+N_{cp}-1 \quad \text{(Eq. 3)}$$

where $\theta \in [0, N-1]$ is the integer STO, $\epsilon \in (-0.5, 0.5]$ is the CFO normalized to $1/NT_s$, and n is additive white Gaussian noise (AWGN) with variance $\sigma_n^2$. The received OFDM signal is assumed to be critically sampled (i.e. $N+N_{cp}$ samples per OFDM symbol), and the STO $\theta$ is defined to be the first arrival path received (i.e., the first sample of the received OFDM symbol still including the cyclic prefix). Due to the circular convolution between the OFDM symbol and channel, the received cyclic prefix has L-1 samples corrupted by ISI and $N_{cp}-L+1$ ISI-free samples.

Figure 1A:
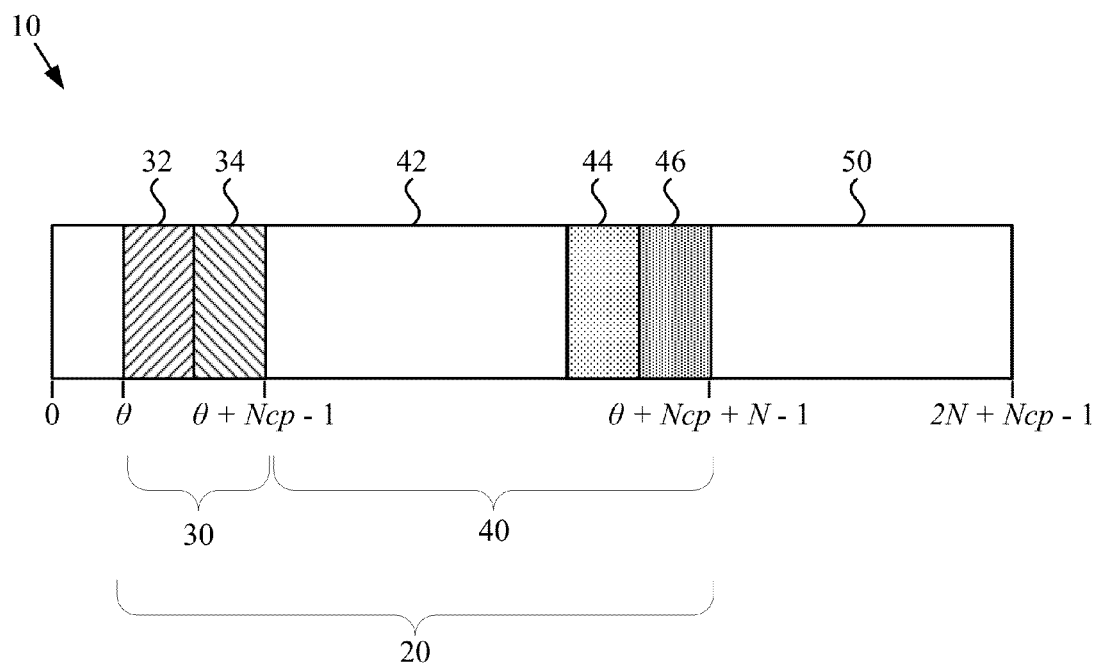
FIG. 1A shows a diagram of an OFDM signal containing a complete OFDM data symbol.
Figure 1B:
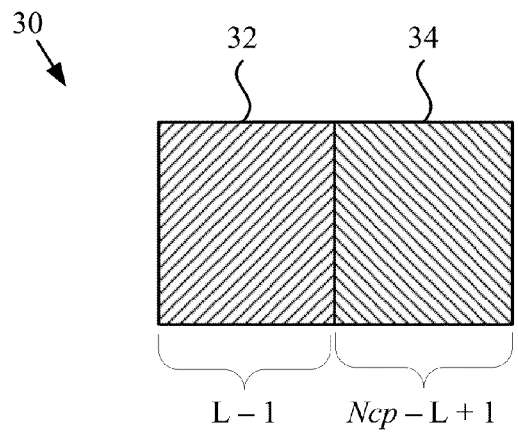
FIG. 1B shows a diagram of the cyclic prefix portion of the OFDM data symbol shown in FIG. 1.

FIG. 1A shows a received OFDM signal 10 containing a complete OFDM symbol 20. Symbol 20 includes a cyclic prefix 30 and a data portion 40. Cyclic prefix includes an inter-symbol interference (ISI) region 32 and an ISI-free region 34. Data portion 40 includes a first data portion 42, a second data portion 44, and a third data portion 46. Data portion 40 contains samples representing the transmitted OFDM symbol. First data portion 42 represents the samples that have not been affected by interference. Second data portion 44 is a data region that corresponds to ISI region 32. Third data portion 46 is a data region that corresponds to ISI-free region 34. As shown in FIG. 1B, ISI region 32 has a length of L-1 and ISI-free region 34 has a length of $N_{cp}-L+1$.

The proposed estimator disclosed herein exploits the assumption that OFDM is based on, namely that the channel order is less than or equal to the length of the cyclic prefix. This assumption guarantees that there is always at least one ISI-free sample in the received cyclic prefix (i.e., $r(\theta+N_{cp}-1)$). The embodiments disclosed herein aim to find the STO estimate that minimizes the squared difference between this ISI free sample and its corresponding data sample (i.e., $r(\theta+N_{cp}+N-1)$), which can be formulated from (Eq. 3) as $$\hat{\theta}^* = \operatorname*{argmin}_{\hat{\theta}\in[0,N-1]}\left|e^{j2\pi\epsilon}r(\hat{\theta}+N_{cp}-1)-r(N+\hat{\theta}+N_{cp}-1)\right|^2 \quad \text{(Eq. 4)}$$

Notice that the estimator is "shifted" so that $r(\theta+N_{cp}-1)$ is used in the evaluation of the STO estimate at $\theta$. In order to make the STO estimator's performance immune to the presence of CFO, the cost function in (Eq. 4) is simplified to $$\left|r(\hat{\theta}+N_{cp}-1)\right|^2 + \left|r(N+\hat{\theta}+N_{cp}-1)\right|^2 - \quad \text{(Eq. 5)}$$
$$2\operatorname{Re}\{r(\hat{\theta}+N_{cp}-1)r^*(N+\hat{\theta}+N_{cp}-1)e^{j2\pi\epsilon}\}$$

Taking the magnitude of the last term in (Eq. 5), multiplying all the terms by -1, and accumulating over M OFDM symbols results in $$\hat{\theta}^* = \operatorname*{argmax}_{\hat{\theta}\in[0,N-1]}\left|\sum_{m=0}^{M-1}2r(\hat{\theta}+N_{cp}-1+m(N_{cp}+N))\times\right. \quad \text{(Eq. 6)}$$

-continued
$$\left. r^*(N+\hat{\theta}+N_{cp}-1+m(N_{cp}+N))\right| -$$
$$\sum_{m=0}^{M-1}\left|r(\hat{\theta}+N_{cp}-1+m(N_{cp}+N))\right|^2 -$$
$$\sum_{m=0}^{M-1}\left|r(N+\hat{\theta}+N_{cp}-1+m(N_{cp}+N))\right|^2$$

Let J denote the cost function in (Eq. 6). Since J utilizes the correlation between r(k) and r(k+N), its correlation is analyzed next. Using (Eq. 3), the correlation between the received samples r(k) and r(k+N) is $$E[r(k)r^*(k+N)] = \quad \text{(Eq. 7)}$$
$$E\left[e^{-j2\pi\epsilon}\sum_{l_1=0}^{L-1}h(l_1)s(k-l_1)\sum_{l_2=0}^{L-1}h^*(l_2)s^*(k+N-l_2) + \right.$$
$$e^{j2\pi\epsilon k/N}\sum_{l_1=0}^{L-1}h(l_1)s(k-l_1)n^*(k+N) +$$
$$\left. n(k)e^{-j2\pi\epsilon(k+N)/N}\sum_{l_2=0}^{L-1}h^*(l_2)s(k+N-l_2)+n(k)n^*(k+N)\right]$$

All the terms in (Eq. 7), except the first one, are zero since $E[n(k)]=0$ and n is independent of h and s. Using (Eq. 2), this simplifies (Eq. 7) to $$E[r(k)r^*(k+N)] = E\left[e^{-j2\pi\epsilon}\sum_{l=0}^{L-1}h(l)h^*(l)s(k-l)s^*(k+N-l) + \right. \quad \text{(Eq. 8)}$$
$$\left. e^{-j2\pi\epsilon}\sum_{l_1\neq l_2}h(l_1)h^*(l_2)s(k-l_1)s^*(k+N-l_2)\right] =$$

$$\begin{cases} e^{-j2\pi\epsilon}\sigma_s^2\sum_{l=0}^{k-\theta}h(l)h^*(l), & k\in I_1 \\ e^{-j2\pi\epsilon}\sigma_s^2\sum_{l=0}^{L-1}h(l)h^*(l), & k\in I_2 \\ e^{-j2\pi\epsilon}\sigma_s^2\sum_{l=k-N_{cp}+1}^{L-1}h(l)h^*(l), & k\in I_3 \\ 0, & \text{otherwise} \end{cases}$$

where $I_1=\{\theta, \theta+1, \ldots, \theta+L-2\}$, $I_2=\{\theta+L-1, \theta+L, \ldots, \theta+N_{cp}-1\}$, and $I_3=\{\theta+N_{cp}, \theta+N_{cp}+1, \ldots, \theta+N_{cp}+L-2\}$ since $E[h(a)h^*(b)]=0$ for $a\neq b$. Note that the largest correlation values belong to $I_2$. It can also be shown that the zero lag correlation is constant for all values of k, so it can be ignored in the analysis of J.

Recall that the purpose of the STO estimator is to correctly identify $\theta$, so that the receiver can remove the cyclic prefix and subsequently take the FFT of the data samples. Looking at (Eq. 8), if $\theta$ is not correctly identified by the STO estimator, there are still $N_{cp}-L$ other points $(L-1-N_{cp}+\theta\leq\hat{\theta}<\theta)$, upon which after cyclic prefix removal, the data samples do not suffer from ISI. However, there would exist a phase offset that requires frequency domain pilots to compensate. These $N_{cp}-L$ points are not desirable for OFDM systems using differential modulation since frequency domain pilots may not be available. Thus, it is imperative that the STO estimator correctly identifies θ.

As used by the estimator embodiments disclosed herein, J is maximized by all $\hat{\theta} \in I_2$. In order to avoid choosing one of the $N_{cp}-L$ other points as the STO estimate, the boundary between the correlations belonging to $I_2$ and $I_3$ is used to assist the STO estimator (Eq. 6). Equation 8 shows that the difference in correlation between STO estimates $\theta+N_{cp}-1$ and $\theta+N_{cp}$ is proportional to the product of the signal power and power of the first channel tap. It has been observed in measurements of wireless channels that the power of each tap typically decreases with the delay, so the power of the first channel tap can be assumed to be large and thus provide a detectable boundary between $I_2$ and $I_3$.

Hence, the following STO estimator is proposed:

$$\max \hat{\theta} \text{ subject to } \hat{\theta}^* = \underset{\hat{\theta} \in [0, N-1]}{\operatorname{argmax}} J(\hat{\theta}) \quad \text{(Eq. 9)}$$

$$J(\hat{\theta}) > \zeta \times J(\hat{\theta}^*)$$

where ζ is a threshold parameter used to demarcate the boundary between the correlations belonging to $I_2$ and the correlations belonging to $I_3$. To implement (Eq. 9), one would: 1) compute $\hat{\theta}^*$ using (Eq. 6); 2) calculate the threshold $\zeta \times J(\hat{\theta}^*)$; and 3) find the largest STO estimate $\hat{\theta}$ whose cost function J lies above the threshold. Step 3 may be implemented as follows: starting with $\hat{\theta}^*$ from Step 1, keep incrementing the STO estimate by 1 sample until its corresponding cost function no longer lies above the threshold. The last STO estimate whose cost function lies above the threshold is the STO estimate produced by (Eq. 9), which is denoted by $\hat{\theta}^{**}$.

Figure 2:
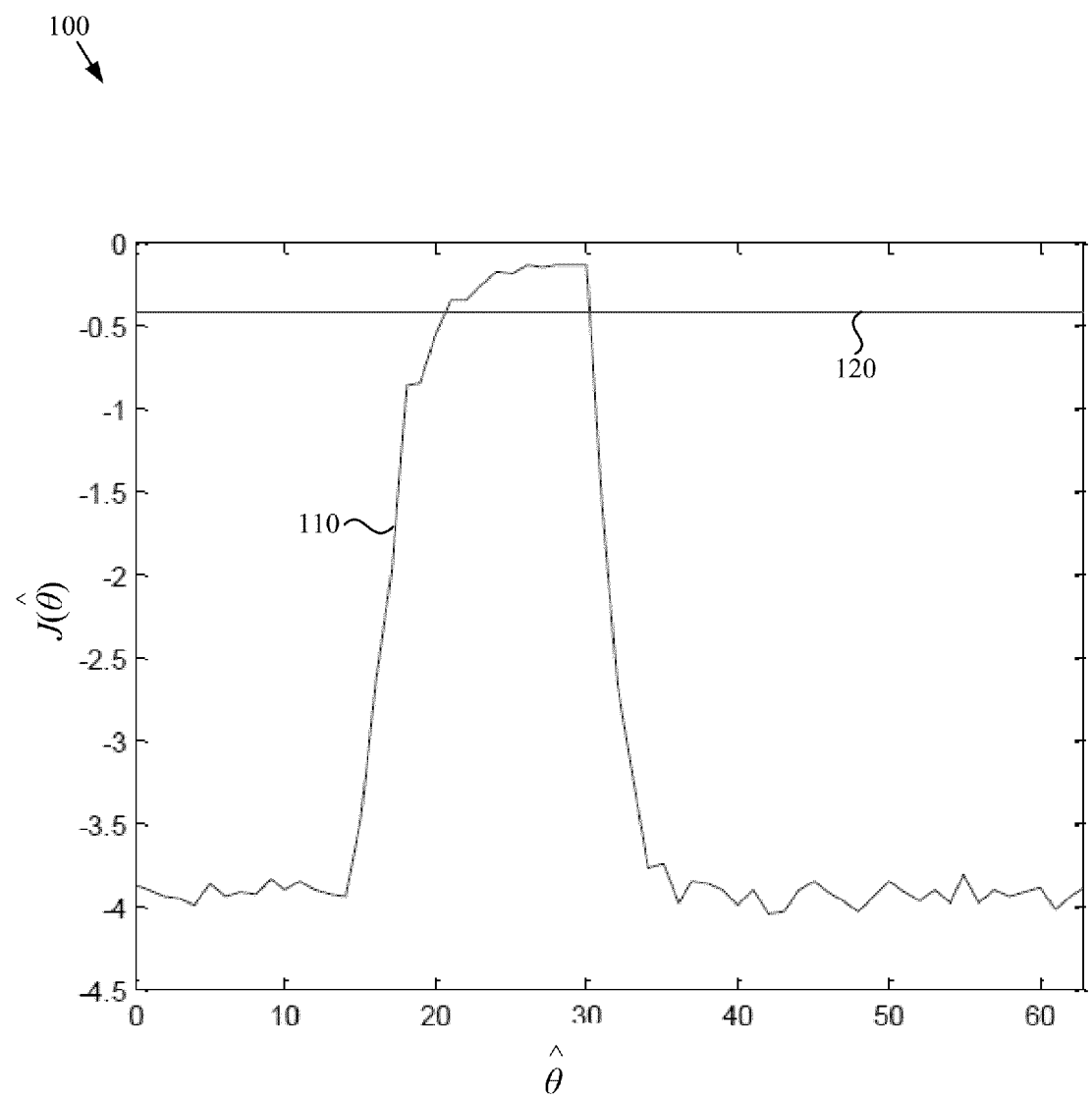
FIG. 2 shows a graph illustrating the average of 1000 simulations of the cost functions versus symbol time offset estimates.

To help visualize the above disclosed estimator, FIG. 2 shows a graph 200 illustrating the mean of 1,000 realizations of the cost function J (represented by line 110) versus STO estimates for a twelfth order channel, M=5, θ=30, and ζ=3. Step 1 produces $\hat{\theta}^*=26$, Step 2 produces the threshold line 120, and Step 3 produces $\hat{\theta}^{**}=30$ because the STO estimates $\hat{\theta}=27$ through $\hat{\theta}=30$ all lie above the threshold whereas $\hat{\theta}=31$ lies below threshold line 120.

The number of complex multiplications and additions performed is used to measure the computational complexity of the estimator. The proposed estimator performs 3N complex multiplications and 3N complex additions for each symbol used. For comparison, the computational complexity of the conditional maximum likelihood (CML) estimator discussed below (a blind estimator that has low computational complexity) is $3(N+N_{cp})-3$ complex multiplications and $6N+3N_{cp}-6$ complex additions for each symbol used if three buffers of size $N_{cp}$ are used.

Up to this point, the focus has been on STO estimation, however, OFDM is sensitive to STO and CFO, both of which need to be estimated. The CFO estimator given by (Eq. 10) achieves the Cramér-Rao bound for AWGN channels and performs well in multipath channels, and is thus adopted. Hence, the CFO estimate is given by $$\hat{\varepsilon}^{} = -\frac{1}{2\pi} \angle \sum_{m=0}^{M-1} \left\{ \sum_{k=0}^{N_{cp}-1} r(k + \hat{\theta}^{} + m(N_{cp} + N)) \times \right. \quad \text{(Eq. 10)}$$

$$\left. r^*(k + N + \hat{\theta}^{**} + m(N_{cp} + N)) \right\}$$

FIGS. 3 through 6 show the STO and CFO mean squared error (MSE) performance of the estimator discussed herein and three other estimators through Monte Carlo simulations with 10,000 realizations, for M=5 and M=20. One estimator is discussed in a publication by Lopez-Salcedo et al., "Unified Framework for the Synchronization of Flexible Multicarrier Communication Signals," *IEEE Trans. Signal Process.*, vol. 61, no. 4, pp. 828-42, February 2013 ("CML estimator"), another estimator is discussed in a publication by Mo, R. et al., "A Joint Blind Timing and Frequency Offset Estimator for OFDM Systems Over Frequency Selective Fading Channels," *IEEE Trans. Wireless Communications*, vol. 5, no. 9, pp. 2594-2604, September 2006 ("Mo estimator"), and the last estimator is discussed in a publication by Liu, X. et al., "Blind Symbol Synchronization for OFDM Systems in Multipath Fading Channels," *Proc. IEEE WiCOM*, Chengdu, China, September 2010, pp. 1-4 ("Liu estimator").

Generic OFDM signals are generated similar to the IEEE 802.11a signal standard where N=64 and $N_{cp}$=16. In all of the simulations, θ=30, ε0.3, ζ=3, and BPSK modulation and Rayleigh fading channels are used where the channel coefficients are normalized to unit power and follow the 3GPP Rural Area channel (Rax) and Typical Urban channel (Tux) models. By varying the bandwidth B of the generic OFDM signals, the Rax is effectively a twelfth order channel (i.e., B=20 MHz and L=12) and the Tux is effectively a sixteenth order channel (i.e., B=7 MHz and L=16).

Figure 3:
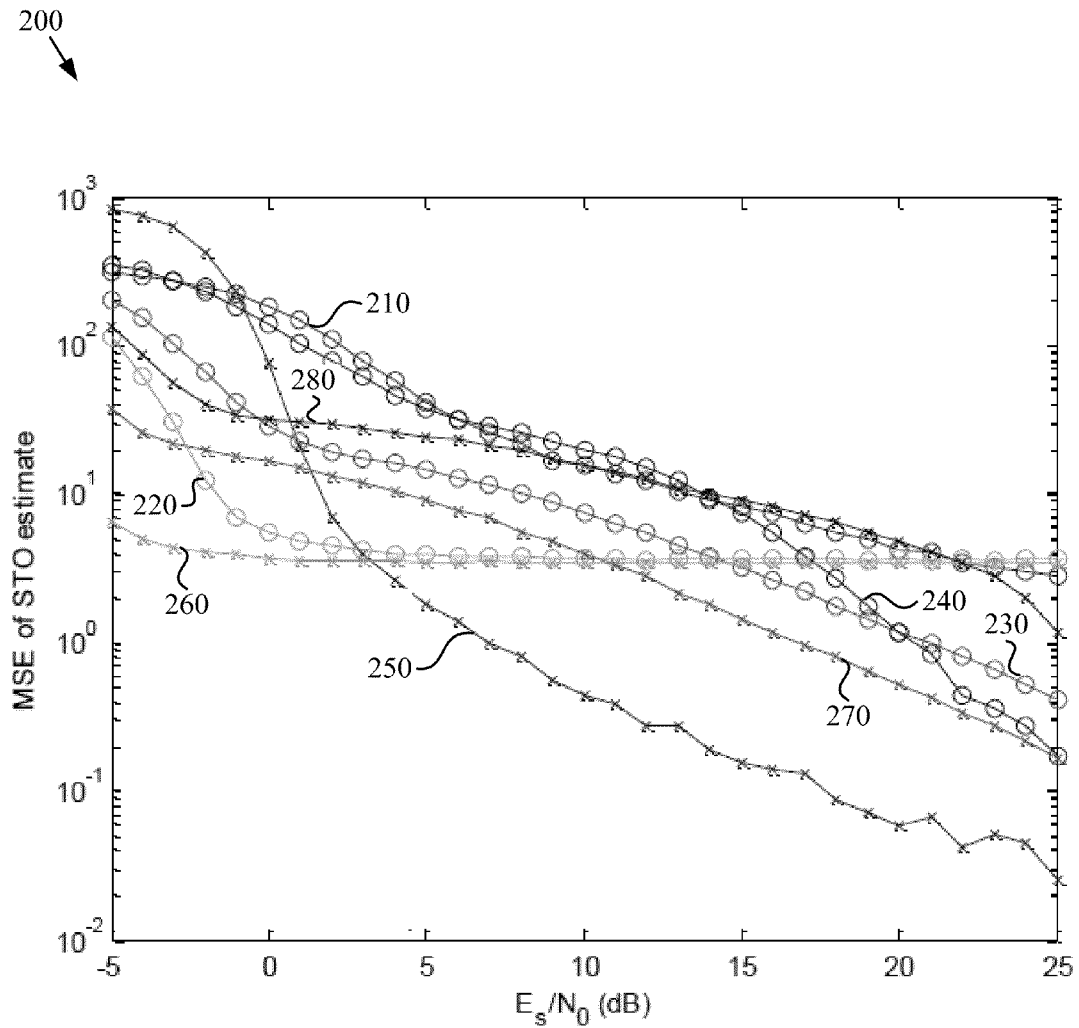
FIG. 3 shows a graph illustrating STO MSE estimation performance for 3GPP Rax channel.

FIG. 3 shows a graph 200 illustrating STO MSE estimation performance for 3GPP Rax channel. As shown, line 210 represents the performance of the estimator discussed herein for M=5, line 220 represents the performance of the CML estimator for M=5, line 230 represents the performance of the Mo estimator for M=5, line 240 represents the performance of the Liu estimator for M=5, line 250 represents the performance of the estimator discussed herein for M=20, line 260 represents the performance of the CML estimator for M=20, line 270 represents the performance of the Mo estimator for M=20, and line 280 represents the performance of the Liu estimator for M=20.

Figure 4:
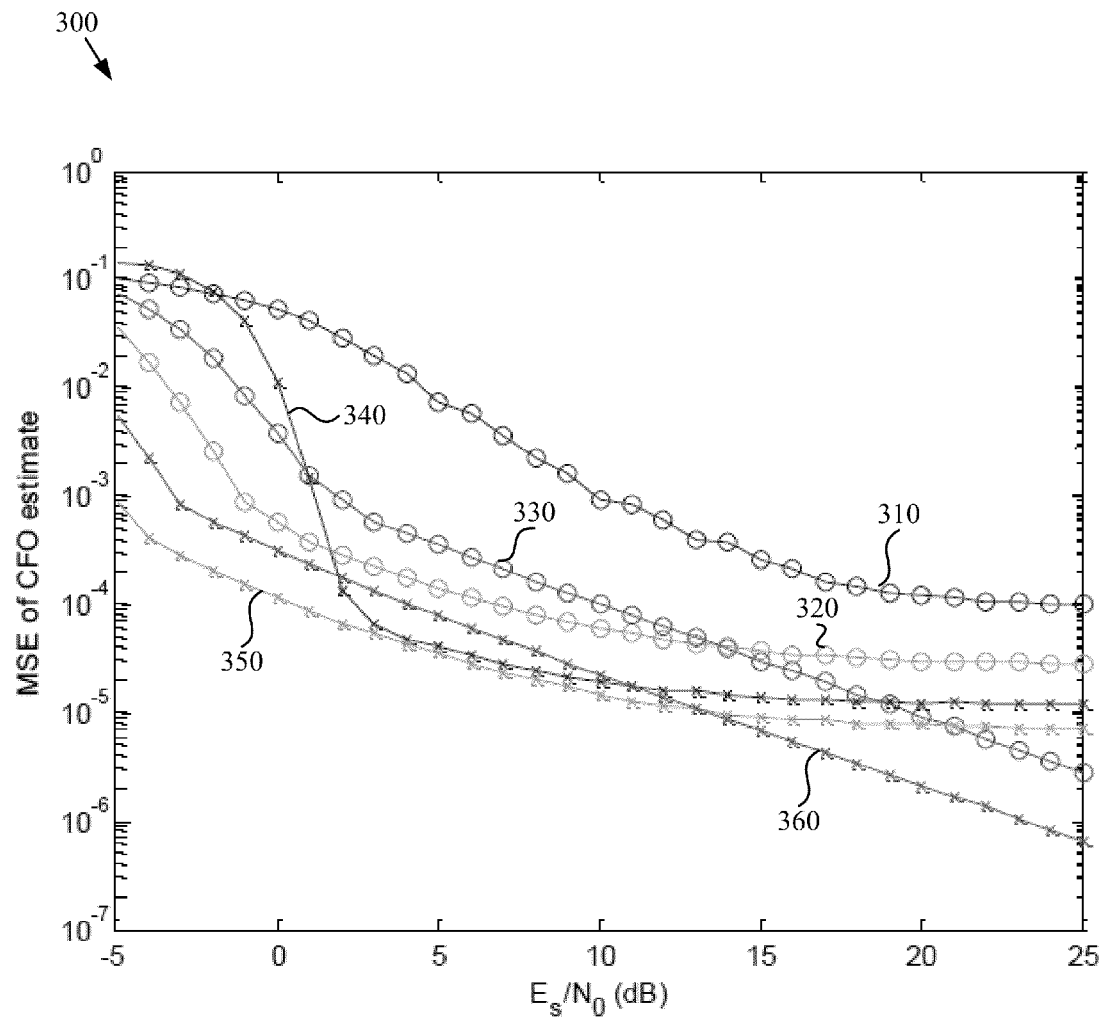
FIG. 4 shows a graph illustrating CFO MSE estimation performance for 3GPP Rax channel.

FIG. 4 shows a graph 300 illustrating CFO MSE estimation performance for 3GPP Rax channel. As shown, line 310 represents the performance of the estimator discussed herein for M=5, line 320 represents the performance of the CML estimator for M=5, line 330 represents the performance of the Mo estimator for M=5, line 340 represents the performance of the estimator discussed herein for M=20, line 350 represents the performance of the CML estimator for M=20, and line 360 represents the performance of the Mo estimator for M=20.

Figure 5:
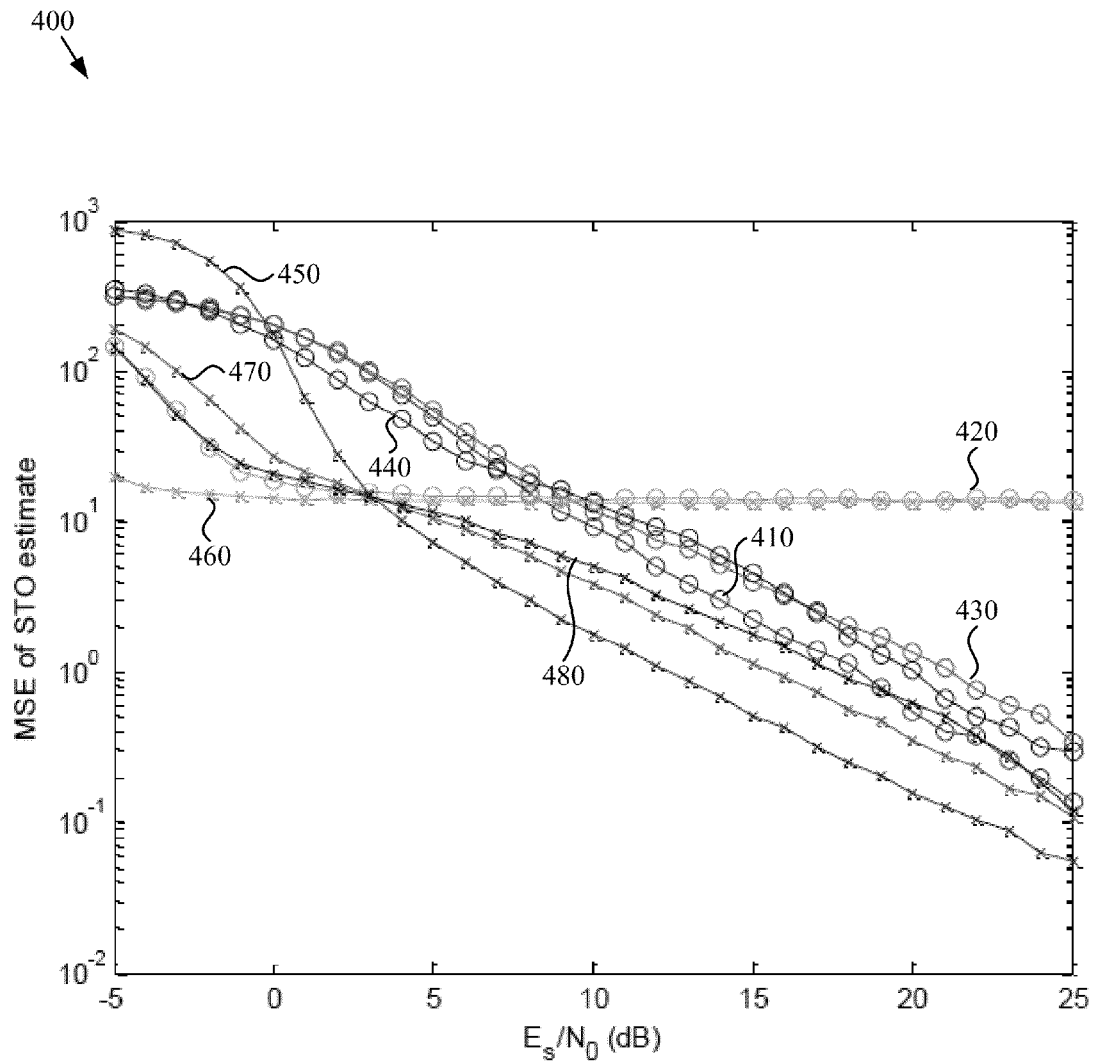
FIG. 5 shows a graph illustrating STO MSE estimation performance for 3GPP Tux channel.

FIG. 5 shows a graph 400 illustrating STO MSE estimation performance for 3GPP Tux channel. As shown, line 410 represents the performance of the estimator discussed herein for M=5, line 420 represents the performance of the CML estimator for M=5, line 430 represents the performance of the Mo estimator for M=5, line 440 represents the performance of the Liu estimator for M=5, line 450 represents the performance of the estimator discussed herein for M=20, line 460 represents the performance of the CML estimator for M=20, line 470 represents the performance of the Mo estimator for M=20, and line 480 represents the performance of the Liu estimator for M=20.

Figure 6:
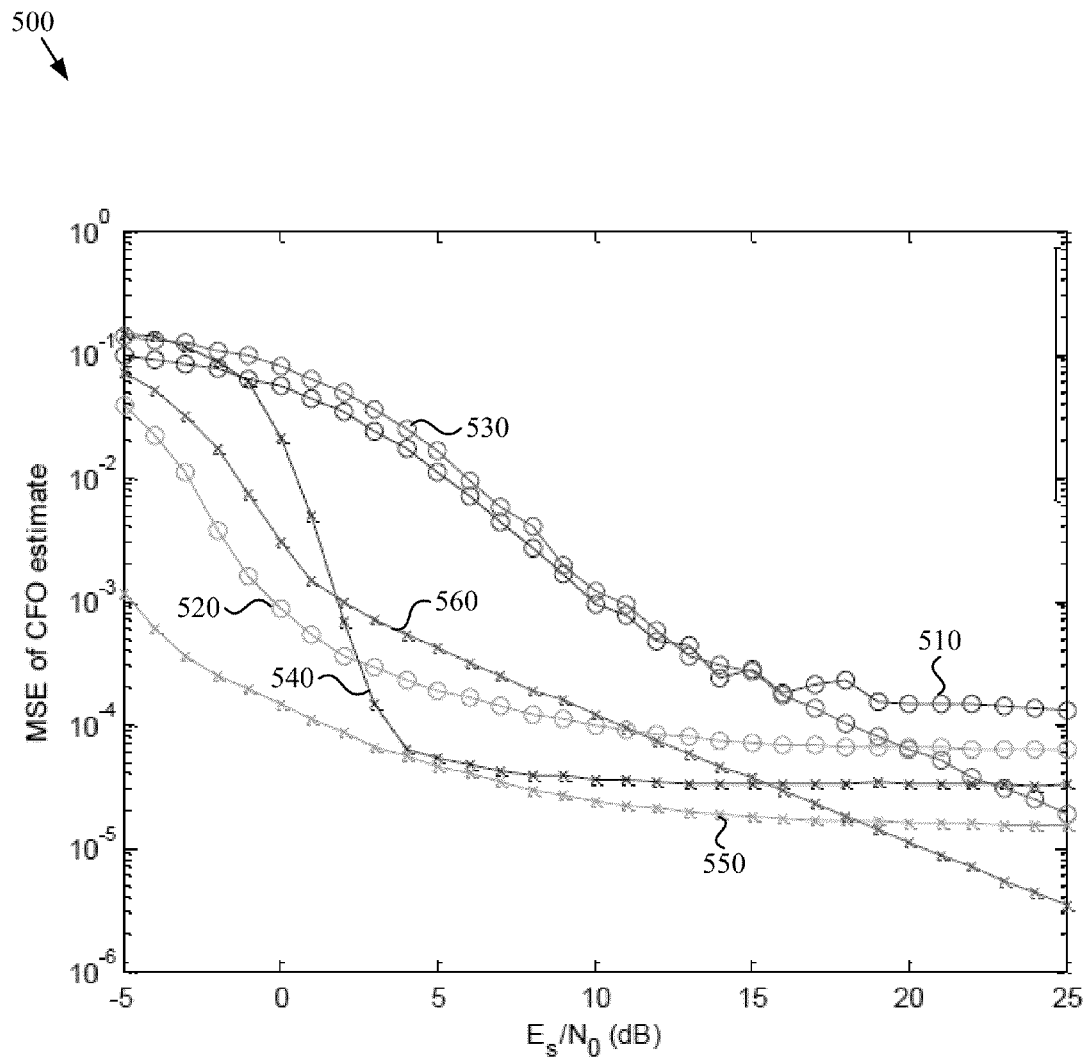
FIG. 6 shows a graph illustrating CFO MSE estimation performance for 3GPP Tux channel.

FIG. 6 shows a graph 500 illustrating CFO MSE estimation performance for 3GPP Tux channel. As shown, line 510 represents the performance of the estimator discussed herein for M =5, line 520 represents the performance of the CML estimator for M=5, line 530 represents the performance of the Mo estimator for M=5, line 540 represents the performance of the estimator discussed herein for M=20, line 550 represents the performance of the CML estimator for M=20, and line 560 represents the performance of the Mo estimator for M=20.

As shown in FIGS. 3-6, for low SNR, the CML estimator performs the best. However, the CML estimator exhibits a flooring effect for higher SNR due to the finite cyclic prefix region used to evaluate the cost function. The estimator disclosed herein has sub-optimal performance for low SNR since it only uses M samples to evaluate its cost function. However, for SNR>0dB, its performance improves as M increases. For SNR>3 dB and M=20, the estimator disclosed herein performs the best in terms of STO MSE and does not exhibit a floor. However, for SNR>4 dB and M=20, the estimator disclosed herein does not perform as well as the CML estimator in terms of CFO MSE.

Figure 7:
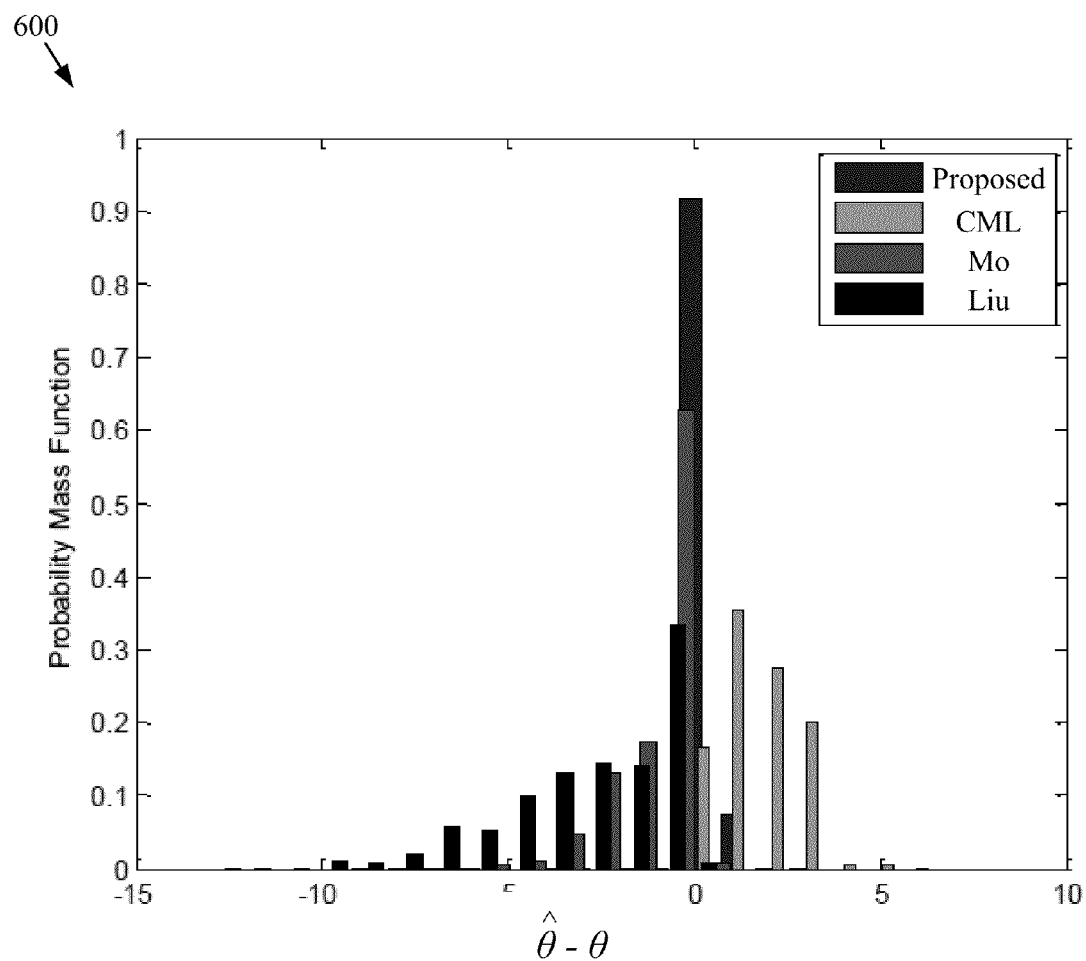
FIG. 7 shows a graph illustrating probability mass function of symbol timing error for a 3GPP Rax channel.
Figure 8:
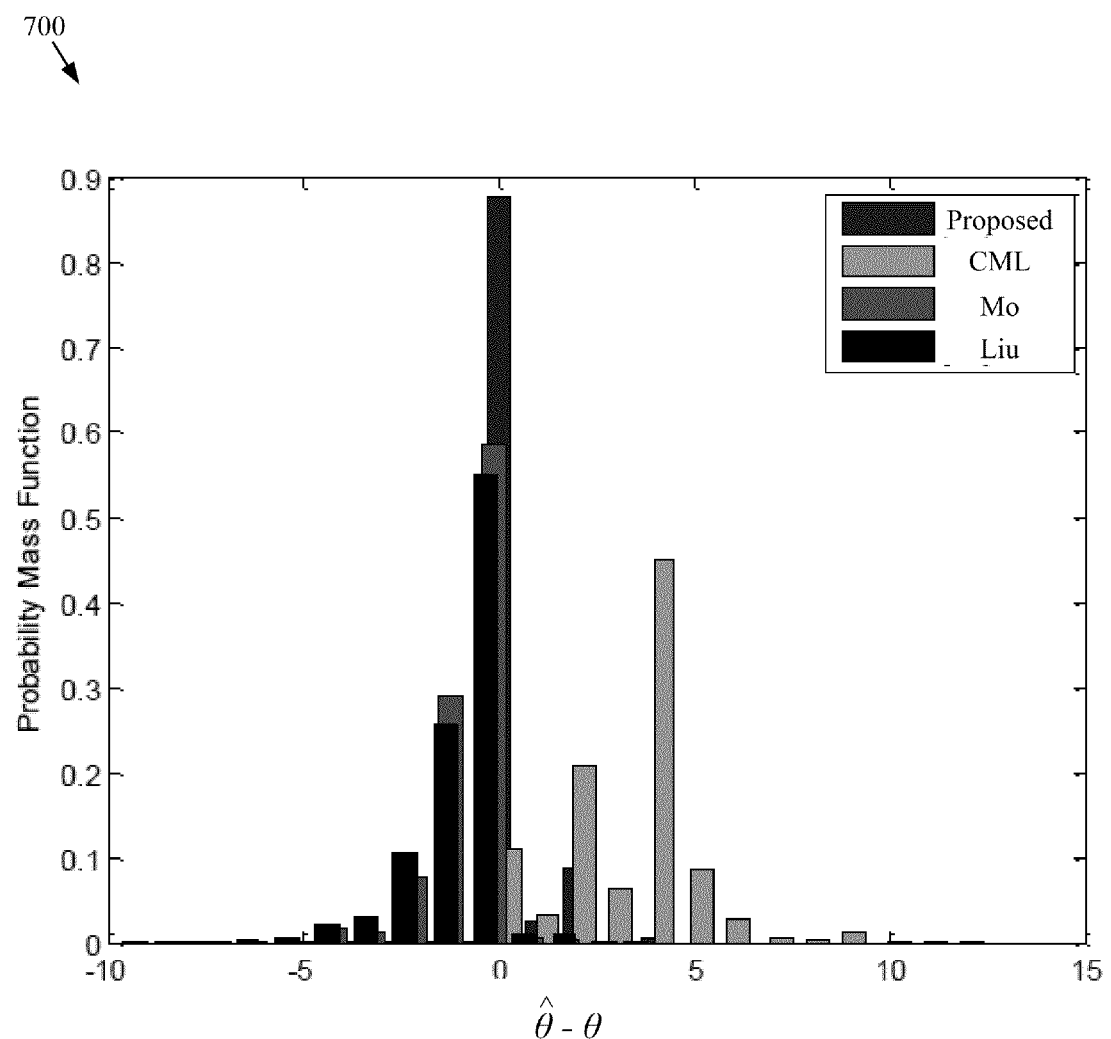
FIG. 8 shows a graph illustrating probability mass function of symbol timing error for a 3GPP Tux channel.

The reason for the superior STO estimation performance of the estimator disclosed herein at high SNR can be explained by FIGS. 7 and 8. FIG. 7 shows a graph 600 illustrating probability mass function of symbol timing error (defined to be $\hat{\theta}-\theta$) for a 3GPP Rax channel, while FIG. 8 shows a graph 700 illustrating probability mass function of symbol timing error for a 3GPP Tux channel. Results are shown for M=20 and $E_s/N_O$=15 dB. For the Rax and Tux channels, the proposed estimator disclosed herein identifies the correct STO almost 92% and 88% of the time, respectively, which is over 29% higher than the Mo estimator. Hence, for higher SNR, the proposed estimator performs the best in terms of STO MSE because it is able to identify the correct STO with a higher probability than the other estimators.

Figure 9:
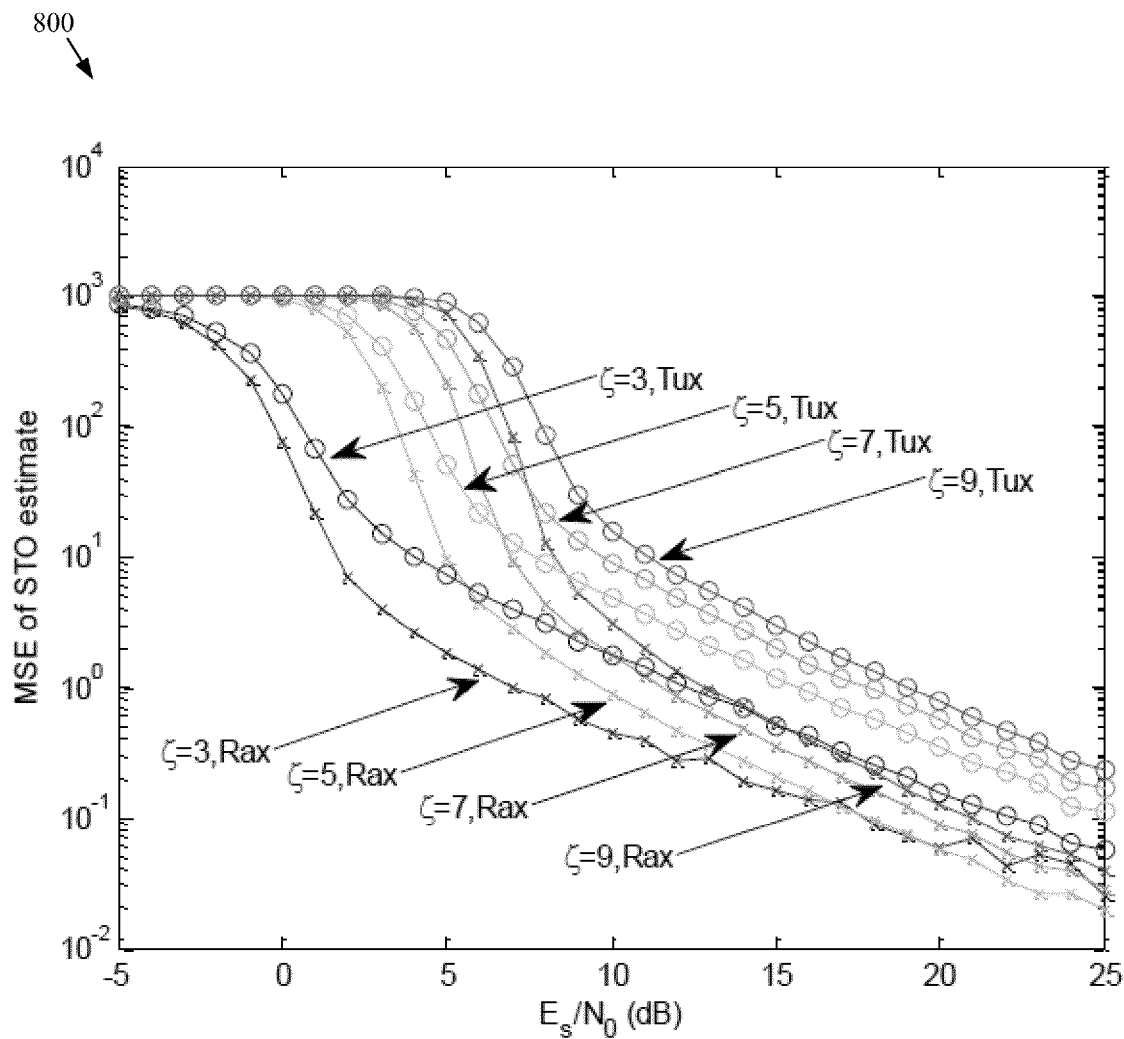
FIG. 9 shows a graph illustrating sensitivity of STO estimate to a threshold parameter $\zeta$.
Figure 10:
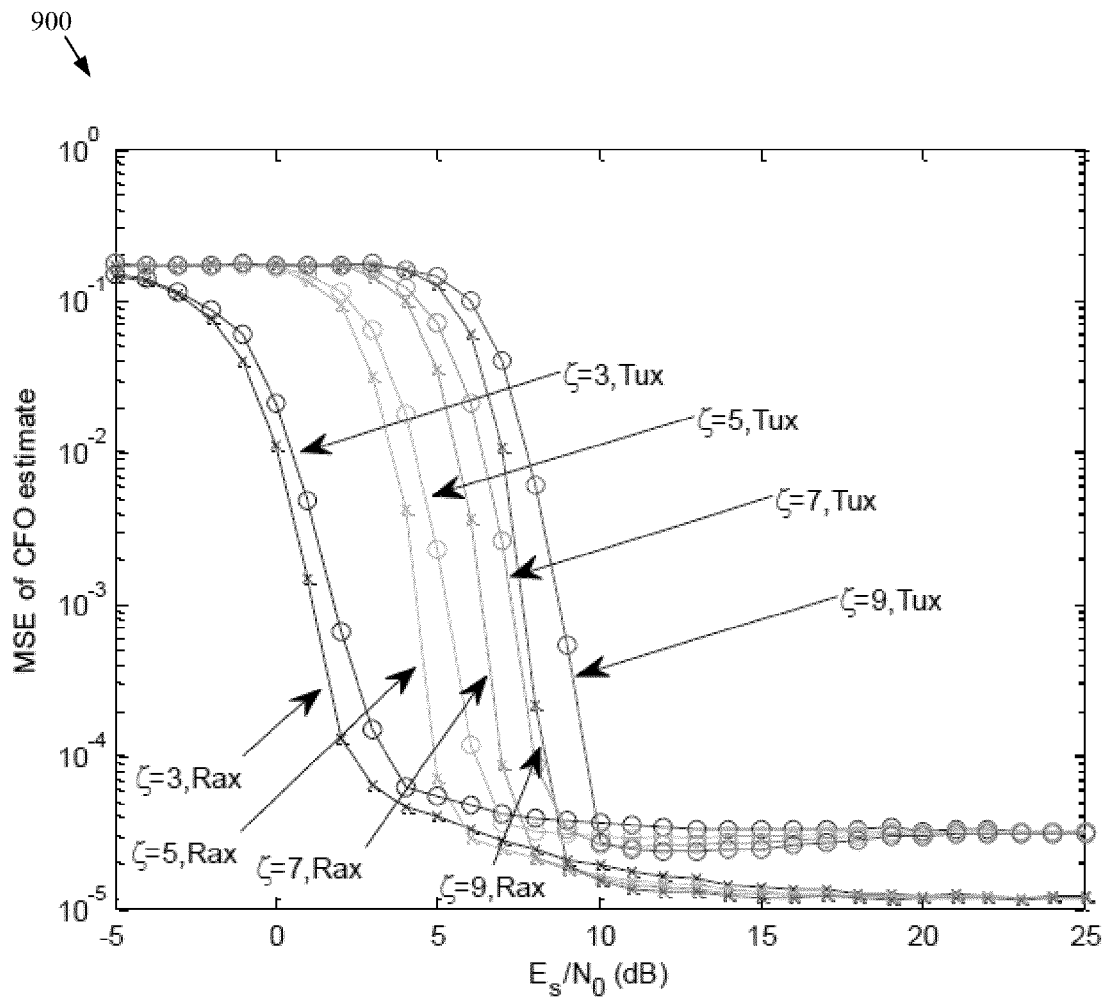
FIG. 10 shows a graph illustrating sensitivity of CFO estimate to a threshold parameter $\zeta$.

Finally, since the estimation performance of (Eq. 9) is dependent on $\zeta$, which is dependent on the power of the first channel tap, the sensitivity of the estimator to $\zeta$ is explored. FIG. 9 shows a graph 800 illustrating sensitivity of STO estimate to a threshold parameter $\zeta$ for the proposed estimator, while FIG. 10 shows a graph 900 illustrating sensitivity of CFO estimate to $\zeta$, each for M=20 and showing curves representing $\zeta$ values of 3, 5, 7, and 9. As shown, the estimator disclosed herein is sensitive to $\zeta$ for SNR<10 dB, and less sensitive for SNR>10 dB, with smaller values of $\zeta$ performing the best. This makes sense because, looking at FIG. 2, smaller values of $\zeta$ keep the threshold high enough so that the boundary between the correlations belonging to $I_2$ and the correlations belonging to $I_3$ is correctly identified. Also, the estimator disclosed herein performs better in the Rax channel than the Tux channel because the power of the first channel tap is stronger in the Rax channel.

Figure 11:
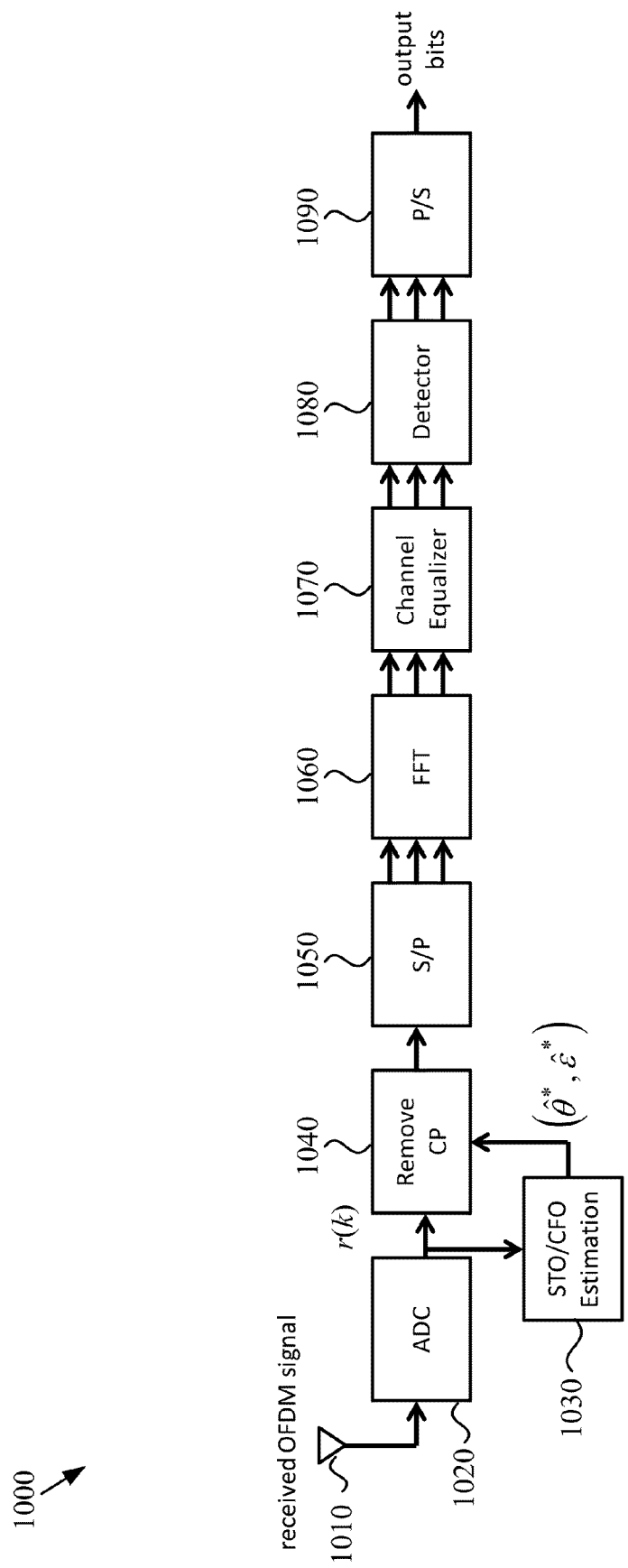
FIG. 11 shows a diagram of an embodiment of an OFDM receiver system that may be used to implement embodiments of methods in accordance with the Low-Complexity Non-Data-Aided Estimation of Symbol Time Offset in OFDM Systems.

FIG. 11 shows a diagram of an embodiment of an OFDM receiver system 1000 that may be used to implement the embodiments of the methods in accordance with the Low-Complexity Non-Data-Aided Estimation of Symbol Time Offset in OFDM Systems. System 1000 may include antenna 1010 that receives an OFDM signal such as signal 10 shown in FIG. 1. The received signal may then be converted to digital form using analog-to-digital converter (ADC) 1020. The output of ADC 1020 is sent to the STO/CFO estimation block 1030 and block 1040. The output block 1030 is a STO and CFO estimate, and based upon this estimate, the cyclic prefix of the OFDM symbol is removed at block 1040.

After removal of the cyclic prefix, the serial stream of OFDM symbols are reshaped into N parallel streams 1050, upon which a Fast Fourier Transform (FFT) is performed 1060. After the FFT 1060, a channel equalizer 1070 removes the channel's effect on the OFDM symbol in the frequency domain. The output of channel equalizer 1070 is demodulated 1080, where the OFDM symbols are converted into binary data, and the N parallel streams of binary data are reshaped into one serial stream 1090. The processing performed in blocks 1030-1090 may be performed by a processor that is connected to ADC 1020.

Figure 12:
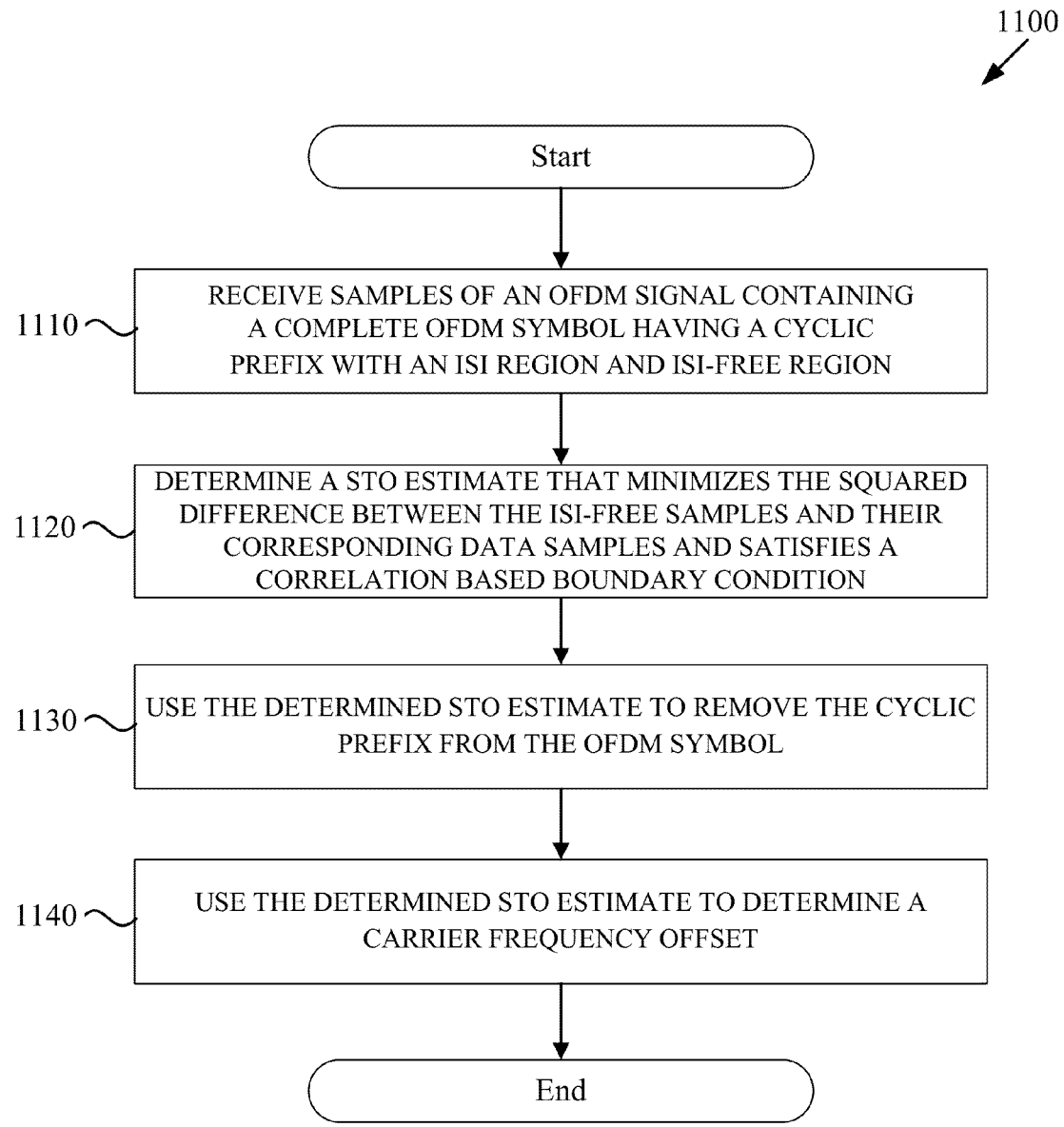
FIG. 12 shows a flowchart of an embodiment of a method in accordance with the Low-Complexity Non-Data-Aided Estimation of Symbol Time Offset in OFDM Systems.

FIG. 12 shows a flowchart of an embodiment of a method 1100 in accordance with the Low-Complexity Non-Data-Aided Estimation of Symbol Time Offset in OFDM Systems. As an example, method 1100 may be performed by system 1000 as shown in FIG. 11, using signal 10 as shown in FIG. 1, and will be discussed with reference thereto. Further, while FIG. 12 shows one embodiment of method 1100 to include steps 1110-1140, other embodiments of method 1100 may contain fewer or more steps. Further, while in some embodiments the steps of method 1100 may be performed as shown in FIG. 12, in other embodiments the steps may be performed in a different order, or certain steps may occur simultaneously with one or more other steps.

Method 1100 may begin with step 1110, which involves receiving a plurality of samples of at least one transmitted OFDM signal, such as signal 10 shown in FIG. 1. As an example, the samples may be received at box 1030 in FIG. 11. The samples contain at least one complete OFDM symbol 20 including data samples in data portion 40 and a cyclic prefix 30 comprising inter-symbol interference (ISI) samples in ISI region 32 and one or more ISI-free samples in region 34.

Step 1120 involves determining a symbol time offset (STO) estimate $\theta$ that minimizes the squared difference between the ISI-free samples in ISI region 32 and their corresponding data samples in third data portion 46 and that also satisfies a correlation based boundary condition. In some embodiments, step 1120 involves maximizing the set of possible STO estimates, $\hat{\theta}$, subject to $$\hat{\theta}^* = \underset{\hat{\theta} \in [0,N-1]}{\operatorname{argmax}} J(\hat{\theta}),$$

where N is the number of sub-carriers of the OFDM signal, $\zeta$ is a threshold parameter used to demarcate a boundary between correlations belonging to $I_2$ and correlations belonging to $I_3$, $I_2=\{\theta+L-1,\theta+L, \ldots, \theta+N_{cp}-1\}$, $I_3=\{\theta+N_{cp}, \theta+N_{cp}+1, \ldots, \theta+N_{cp}+L-2\}$, J is a cost function, L is an order of a channel experienced by the ODFM signal, $N_{cp}$ is the length of the cyclic prefix, and $L \leq N_{cp}$.

In some embodiments, the step of maximizing $\hat{\theta}$ involves determining $\hat{\theta}^*$, calculating a threshold $\zeta \times J(\hat{\theta}^*)$, and determining $\hat{\theta}^{}$, the largest STO estimate $\hat{\theta}$ whose cost function J lies above the threshold. In some embodiments, determining $\hat{\theta}^{}$ involves incrementing, starting with $\hat{\theta}^*$, the STO estimate by one sample until its corresponding cost function no longer lies above the threshold, wherein the last STO estimate whose cost function lies above the threshold is $\hat{\theta}^{**}$.

In some embodiments, $\hat{\theta}^*$ is determined using the equation $$\hat{\theta}^* = \underset{\hat{\theta} \in [0,N-1]}{\operatorname{argmax}} \left| \sum_{m=0}^{M-1} 2r(\hat{\theta} + N_{cp} - 1 + m(N_{cp} + N)) \times r^*(N + \hat{\theta} + N_{cp} - 1 + m(N_{cp} + N)) \right| -$$

-continued $$\sum_{m=0}^{M-1} |r(\hat{\theta} + N_{cp} - 1 + m(N_{cp} + N))|^2 -$$

$$\sum_{m=0}^{M-1} |r(N + \hat{\theta} + N_{cp} - 1 + m(N_{cp} + N))|^2,$$

where M is the total number of OFDM symbols, m is an indexing variable, r is the received OFDM samples, and r* is a complex conjugate of r.

In some embodiments, the cost function J is defined by the equation $$J(\hat{\theta}) =$$

$$\left|\sum_{m=0}^{M-1} 2r(\hat{\theta} + N_{cp} - 1 + m(N_{cp} + N)) \times r^*(N + \hat{\theta} + N_{cp} - 1 + m(N_{cp} + N))\right| -$$

$$\sum_{m=0}^{M-1} |r(\hat{\theta} + N_{cp} - 1 + m(N_{cp} + N))|^2 -$$

$$\sum_{m=0}^{M-1} |r(N + \hat{\theta} + N_{cp} - 1 + m(N_{cp} + N))|^2,$$

where M is the total number of OFDM symbols, m is an indexing variable, r is the received OFDM samples, and r* is a complex conjugate of r.

In some embodiments, method 1100 proceeds from step 1120 to step 1130, which involves determining a carrier frequency offset (CFO) using $\hat{\theta}^{}$. In some embodiments, the CFO is determined using the equation $$\hat{\varepsilon}^{} = -\frac{1}{2\pi} L$$

$$\sum_{m=0}^{M-1} \left\{ \sum_{k=0}^{N_{cp}-1} r(k + \hat{\theta}^{**} + m(N_{cp} + N)) \times r^*(k + N + \hat{\theta}^{**} + m(N_{cp} + N)) \right\},$$

where $\hat{\varepsilon}^{**}$ is the CFO, M is the total number of OFDM symbols, m and k are indexing variables, r is the received OFDM samples, and r* is a complex conjugate of.

In some embodiments, method 1100 then proceeds to step 1140, which involves using $\hat{\theta}^{}$ to remove the cyclic prefix from the OFDM symbol. In some embodiments, method 1100 proceeds to step 1140 directly from step 1120**.

Method 1100 may be implemented as a series of modules, either functioning alone or in concert, with physical electronic and computer hardware devices. Method 1100 may be computer-implemented as a program product comprising a plurality of such modules, which may be displayed for a user.

Various storage media, such as magnetic computer disks, optical disks, and electronic memories, as well as non-transitory computer-readable storage media and computer program products, can be prepared that can contain information that can direct a device, such as a micro-controller, to implement the above-described systems and/or methods. Once an appropriate device has access to the information and programs contained on the storage media, the storage media can provide the information and programs to the device, enabling the device to perform the above-described systems and/or methods.

For example, if a computer disk containing appropriate materials, such as a source file, an object file, or an executable file, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods, and coordinate the functions of the individual systems and/or methods.

Many modifications and variations of the Low-Complexity Non-Data-Aided Estimation of Symbol Time Offset in OFDM Systems are possible in light of the above description. Within the scope of the appended claims, the embodiments of the systems described herein may be practiced otherwise than as specifically described. The scope of the claims is not limited to the implementations and the embodiments disclosed herein, but extends to other implementations and embodiments as may be contemplated by those having ordinary skill in the art.

I claim:

1. A method comprising the steps of:
   receiving, at an antenna of a receiver system, a plurality of samples of at least one orthogonal frequency division multiplex (OFDM) signal, the samples containing at least one complete OFDM symbol including data samples and a cyclic prefix comprising inter-symbol interference (ISI) samples and one or more ISI-free samples;
   using an analog-to-digital converter (ADC) operatively connected to the antenna to convert the samples of the OFDM signal into digital samples;
   using a processor operatively connected to the ADC and using the digital samples to determine a symbol time offset (STO) estimate θ that minimizes the squared difference between the ISI-free samples and their corresponding data samples and satisfies a correlation based boundary condition; and
   using the processor to remove the cyclic prefix from the OFDM symbol based upon the determined STO estimate.

2. The method of claim 1, wherein the step of determining the STO estimate θ that minimizes the squared difference between the ISI-free samples and their corresponding data samples and satisfies a correlation based boundary condition comprises maximizing the set of possible symbol time offset (STO) estimates, $\hat{\theta}$, subject to $$\hat{\theta}^* = \underset{\hat{\theta} \in [0, N-1]}{\operatorname{argmax}} J(\hat{\theta}),$$

where N is the number of sub-carriers of the OFDM signal, ζ is a threshold parameter used to demarcate a boundary between correlations belonging to $I_2$ and correlations belonging to $I_3$, $I_2 = \{\theta + L - 1, \theta + L, \ldots, \theta + N_{cp} - 1\}$, $I_3 = \{\theta + N_{cp}, \theta + N_{cp} + 1, \ldots, \theta + N_{cp} + L - 2\}$, J is a cost function, L is an order of a channel experienced by the ODFM signal, $N_{cp}$ is the length of the cyclic prefix, and $L \le N_{cp}$.

3. The method of claim 2, wherein the step of maximizing $\hat{\theta}$ comprises the steps of:
   determining $\hat{\theta}^*$;
   calculating a threshold $\zeta \times J(\hat{\theta}^*)$; and
   determining $\hat{\theta}^{**}$, the largest STO estimate $\hat{\theta}$ whose cost function J lies above the threshold.

4. The method of claim 3, wherein the step of determining $\hat{\theta}^{**}$ comprises the step of incrementing, starting with $\hat{\theta}^*$, the STO estimate by one sample until its corresponding cost function no longer lies above the threshold, wherein the last STO estimate whose cost function lies above the threshold is $\hat{\theta}^{**}$.

5. The method of claim 4 further comprising the step of determining a carrier frequency offset (CFO) using $\hat{\theta}^{**}$.

6. The method of claim 5, wherein the CFO is determined using the equation $$\hat{\varepsilon}^{**} = -\frac{1}{2\pi}L$$

$$\sum_{m=0}^{M-1}\left\{\sum_{k=0}^{N_{cp}-1} r(k+\hat{\theta}^{**} + m(N_{cp}+N))\times r^*(k+N+\hat{\theta}^{**} + m(N_{cp}+N))\right\},$$

where $\hat{\epsilon}^{**}$ is the CFO, M is the total number of OFDM symbols, m and k are indexing variables, r is the received OFDM samples, and r* is a complex conjugate of r.

7. The method of claim 5, wherein the step of using the processor to remove the cyclic prefix from the OFDM symbol based upon the determined STO estimate comprises using $\hat{\theta}^{**}$ to remove the cyclic prefix from the OFDM symbol.

8. The method of claim 3, wherein $\hat{\theta}^*$ is determined using the equation $$\hat{\theta}^* = \underset{\hat{\theta}\in[0,N-1]}{\mathrm{argmax}}\left|\sum_{m=0}^{M-1} 2r(\hat{\theta}+N_{cp}-1+m(N_{cp}+N))\times\right.$$

$$\left. r^*(N+\hat{\theta}+N_{cp}-1+m(N_{cp}+N))\right| -$$

$$\sum_{m=0}^{M-1}\left|r(\hat{\theta}+N_{cp}-1+m(N_{cp}+N))\right|^2 -$$

$$\sum_{m=0}^{M-1}\left|r(N+\hat{\theta}+N_{cp}-1+m(N_{cp}+N))\right|^2,$$

where M is the total number of OFDM symbols, m is an indexing variable, r is the received OFDM samples, and r* is a complex conjugate of r.

9. The method of claim 3, wherein the cost function J is defined by the equation $$J(\hat{\theta}) =$$

$$\left|\sum_{m=0}^{M-1} 2r(\hat{\theta}+N_{cp}-1+m(N_{cp}+N))\times r^*(N+\hat{\theta}+N_{cp}-1+m(N_{cp}+N))\right| -$$

$$\sum_{m=0}^{M-1}\left|r(\hat{\theta}+N_{cp}-1+m(N_{cp}+N))\right|^2 -$$

$$\sum_{m=0}^{M-1}\left|r(N+\hat{\theta}+N_{cp}-1+m(N_{cp}+N))\right|^2,$$

where M is the total number of OFDM symbols, m is an indexing variable, r is the received OFDM samples, and r* is a complex conjugate of r.

10. A system comprising:
an antenna configured to receive a plurality of samples of at least one OFDM signal, the samples containing at least one complete OFDM symbol including a cyclic prefix comprising ISI samples and one or more ISI-free samples;

an analog-to-digital converter (ADC) operatively connected to the antenna, the ADC configured to convert the samples of the OFDM signal into digital samples; and a processor, operatively connected to the ADC, configured to use the digital samples to determine a symbol time offset (STO) estimate θ that minimizes the squared difference between the ISI-free samples and their corresponding data samples and satisfies a correlation based boundary condition, the processor further configured to remove the cyclic prefix from the OFDM symbol based upon the determined STO estimate.

11. The system of claim 10, wherein the processor is configured to determine the STO estimate θ that minimizes the squared difference between the ISI-free samples and their corresponding data samples and satisfies a correlation based boundary condition by maximizing the set of possible symbol time offset (STO) estimates, $\hat{\theta}$, subject to $$\hat{\theta}^* = \underset{\hat{\theta}\in[0,N-1]}{\mathrm{argmax}} J(\hat{\theta}),$$

where N is the number of sub-carriers of the OFDM signal, $\zeta$ is a threshold parameter used to demarcate a boundary between correlations belonging to $I_2$ and correlations belonging to $I_3$, $I_2=\{\theta+L-1, \theta+L, \ldots, \theta+N_{cp}-1\}$, $I_3=\{\theta+N_{cp}, \theta+N_{cp}+L-2\}$, J is a cost function, L is an order of a channel experienced by the ODFM signal, $N_{cp}$ is the length of the cyclic prefix, and $L\leq N_{cp}$.

12. The system of claim 11, wherein the processor is configured to maximize $\hat{\theta}$ by determining $\hat{\theta}^*$, calculating a threshold $\zeta\times J(\hat{\theta}^*)$, and determining $\hat{\theta}^{**}$, the largest STO estimate $\hat{\theta}$ whose cost function J lies above the threshold.

13. The system of claim 12, wherein the processor is configured to determine $\hat{\theta}^{**}$ by incrementing, starting with $\hat{\theta}^*$, the STO estimate by one sample until its corresponding cost function no longer lies above the threshold, wherein the last STO estimate whose cost function lies above the threshold is $\hat{\theta}^{**}$.

14. The system of claim 13, wherein the processor is further configured to determine a carrier frequency offset (CFO) using $\hat{\theta}^{**}$.

15. The system of claim 14, wherein the processor is configured to determine the CFO using the equation $$\hat{\varepsilon}^{**} = -\frac{1}{2\pi}L$$

$$\sum_{m=0}^{M-1}\left\{\sum_{k=0}^{N_{cp}-1} r(k+\hat{\theta}^{**} + m(N_{cp}+N))\times r^*(k+N+\hat{\theta}^{**} + m(N_{cp}+N))\right\},$$

where $\hat{\epsilon}^{**}$ is the CFO, M is the total number of OFDM symbols, m and k are indexing variables, r is the received OFDM samples, and r* is a complex conjugate of r.

16. The system of claim 14, wherein the processor is further configured to use $\hat{\theta}^{**}$ to remove the cyclic prefix from the OFDM symbol.

17. The system of claim 12, wherein the processor is configured to determine $\hat{\theta}^*$ using the equation $$\hat{\theta}^* = \underset{\hat{\theta}\in[0,N-1]}{\operatorname{argmax}} \left| \sum_{m=0}^{M-1} 2r(\hat{\theta} + N_{cp} - 1 + m(N_{cp} + N)) \times r^*(N + \hat{\theta} + N_{cp} - 1 + m(N_{cp} + N)) \right| - \sum_{m=0}^{M-1} |r(\hat{\theta} + N_{cp} - 1 + m(N_{cp} + N))|^2 - \sum_{m=0}^{M-1} |r(N + \hat{\theta} + N_{cp} - 1 + m(N_{cp} + N))|^2,$$

where M is the total number of OFDM symbols, m is an indexing variable, r is the received OFDM samples, and r* is a complex conjugate of r.

18. The system of claim 12, wherein the cost function J is defined by the equation $$J(\hat{\theta}) = \left| \sum_{m=0}^{M-1} 2r(\hat{\theta} + N_{cp} - 1 + m(N_{cp} + N)) \times r^*(N + \hat{\theta} + N_{cp} - 1 + m(N_{cp} + N)) \right| - \sum_{m=0}^{M-1} |r(\hat{\theta} + N_{cp} - 1 + m(N_{cp} + N))|^2 - \sum_{m=0}^{M-1} |r(N + \hat{\theta} + N_{cp} - 1 + m(N_{cp} + N))|^2,$$

where M is the total number of OFDM symbols, m is an indexing variable, r is the received OFDM samples, and r* is a complex conjugate of r.

* * * * *